United States Patent [19]

Dahl

[11] 4,065,551

[45] Dec. 27, 1977

[54] METHOD OF RECOVERING FLUORINE FROM CARBONACEOUS WASTE MATERIAL

[75] Inventor: Erik Qvale Dahl, Kristiansand S., Norway

[73] Assignee: Elkem-Spigerverket A/S, Oslo, Norway

[21] Appl. No.: 662,719

[22] Filed: Mar. 1, 1976

Related U.S. Application Data

[63] Continuation-in-part of Ser. No. 483,000, June 25, 1974, abandoned, which is a continuation of Ser. No. 112,585, Feb. 4, 1971, abandoned, which is a continuation-in-part of Ser. No. 795,472, Jan. 31, 1969, abandoned.

[30] Foreign Application Priority Data

Feb. 1, 1968 Norway .................................. 68406

[51] Int. Cl.² .............................................. C01B 7/22
[52] U.S. Cl. .................................... 423/483; 423/484; 423/488
[58] Field of Search .......................... 423/483, 488, 484

[56] References Cited

U.S. PATENT DOCUMENTS

| | | | |
|---|---|---|---|
| 2,426,557 | 8/1947 | Long et al. | 428/402 |
| 2,686,151 | 8/1954 | Feldbauer, Jr. et al. | 423/341 X |
| 2,919,174 | 12/1959 | Pring | 423/240 |
| 3,073,676 | 1/1963 | Mollard et al. | 423/484 |
| 3,102,787 | 9/1963 | McMillan et al. | 423/485 |
| 3,160,473 | 12/1964 | Hayworth et al. | 423/485 |
| 3,198,600 | 8/1965 | Mollard et al. | 423/465 X |
| 3,207,579 | 9/1965 | Burkhard | 423/485 |
| 3,323,861 | 6/1967 | Toyabe et al. | 423/483 |

Primary Examiner—Edward Stern
Attorney, Agent, or Firm—Eyre, Mann, Lucas & Just

[57] ABSTRACT

Particles of solid carbonaceous waste material which contain fluorine are suspended in a stream of gas consisting of a mixture of steam and air to establish a fluidized bed in a retort. The particles are heated to a temperature of not less than 1000° C to cause pyrohydrolysis and the recovery of fluorine as gaseous hydrogen fluoride at a very efficient rate.

7 Claims, 1 Drawing Figure

U.S. Patent  Dec. 27, 1977  4,065,551
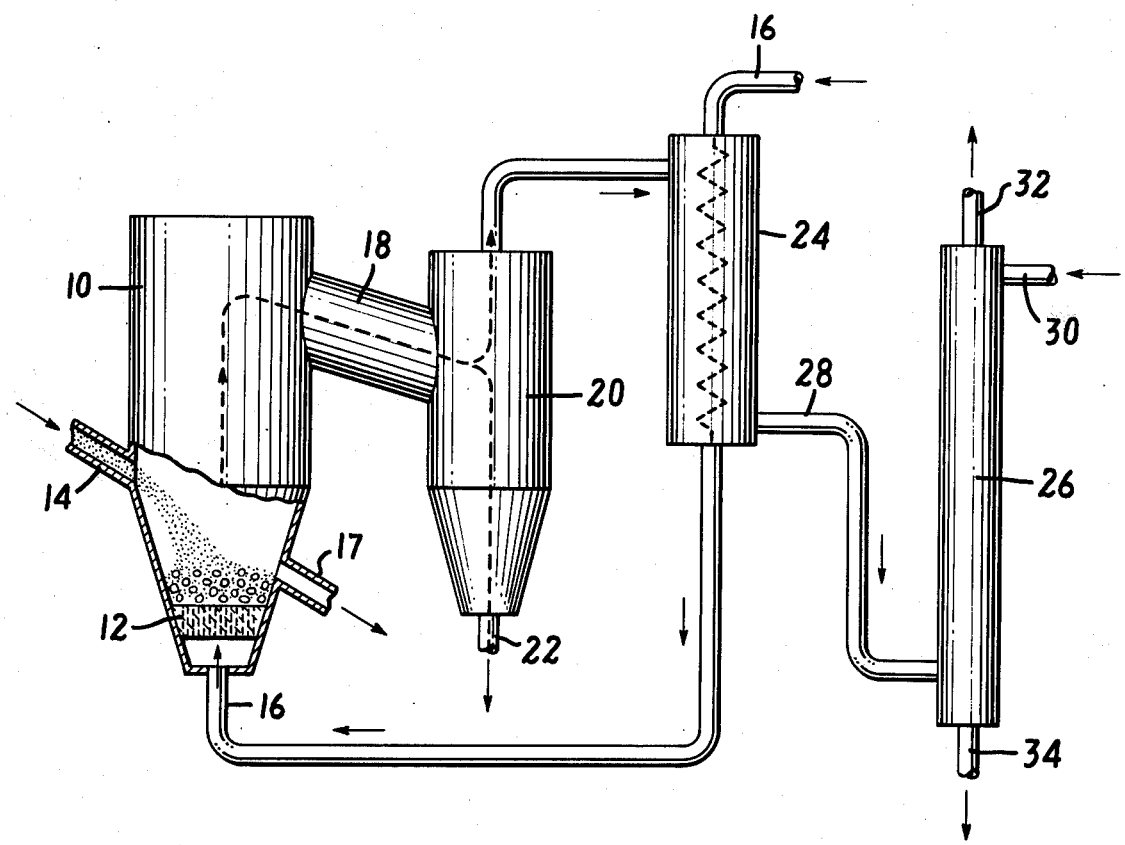
INVENTOR.
ERIK QVALE DAHL
BY Eyre, Mann & Lucas
ATTORNEYS

METHOD OF RECOVERING FLUORINE FROM CARBONACEOUS WASTE MATERIAL

This application is a continuation-in-part of Ser. No. 483,000 filed June 25, 1974 and now abandoned which is a continuation of Ser. No. 112,585 filed Feb. 4, 1971 and now abandoned which in turn was a continuation-in-part application of Ser. No. 795,472 filed Jan. 31, 1969 and now abandoned.

The invention relates to a continuous and efficient process of recovering fluorine from solid carbonaceous waste material from furnaces for melt electrolytic production of aluminum. Such waste carbonaceous material is recovered as used furnace linings and bottoms, soot or scum, and dust from cyclones and electrofilters. Used furnace linings and bottoms from an aluminum furnace will usually contain about 10–15% by weight of fluorine, and the scum and cyclone dust about 30% fluorine.

When the solid carbonaceous waste material from the aluminum electrolysis is heated to a temperature of about 1000° C in the presence of a mixture of steam and air, pyrohydrolysis will take place to liberate fluorine from the waste material in the form of gaseous hydrogen fluoride. The heat of reaction for pyrohydrolysis is generated by combustion of the carbon in the waste material and if necessary added heat may be supplied to maintain the temperature of reaction above 1000° C. Added heat may be supplied in any convenient manner, as for example by adding combustible fuel to the charge of waste carbonaceous material or by means of gas or oil. In the latter case the fuel may be added below the grid. This method results in a higher reaction temperature and thereby the reaction is made more stable and uniform. The gaseous hydrogen fluoride from the pyrohydrolysis is collected, as for example, by absorption in water or in an aqueous alkali solution and then further processed in known manner to cryolite or other fluorine compounds which are used in aluminum electrolysis. Alternatively, the gaseous hydrogen fluoride may be absorbed on the surface of particulate solid material and where aluminum fluoride is desired it is of advantage to absorb the hydrogen fluoride on particles of aluminum oxide.

It has previously been known that fluorine can be recovered from these carbonaceous waste materials by pyrohydrolysis in a batch type process. The batch type method has the disadvantage, however, that the rate of fluorine recovery is linearly proportional to the amount of steam used in the process and high percentages of steam are necessary to recover a high percentage of fluorine. The applicant has discovered that in his continuous process there is no such linear relationship at temperatures above 1000° C and especially at temperatures above 1100° C and, in fact, there can be a fluorine yield as high as 98% using as little as 45% steam with an efficiency of steam use of as low as 13 kilograms of steam used per kilogram of recovered fluorine.

In accordance with the present invention, the pyrohydrolysis reaction is carried out in a suitable reactor by suspending particles of the solid carbonaceous waste material in a stream of a fluidizing gas (usually comprising a mixture of steam and air) that moves up through the reactor in such volume and velocity as to maintain the solid particles in suspension in a fluidized bed. The fluidized bed contributes to the very great efficiency of the reaction in terms of reduced kilograms of steam necessary to the recovery of a kilogram of fluorine and the pyrohydrolysis reaction is carried out as a continuous process. Fluorine yields as high as 98% are obtained by the process.

The charge to the fluidized bed reactor is prepared by crushing the solid carbonaceous waste material to a grain size of not over about ten millimeters and best results have been achieved when the material is crushed to a size of not over about 3 millimeters. Combustible fuel of a similar grain size may be added to the charge entering the reactor if necessary to maintain the desired temperature for reaction which is not less than about 1000° C. The fluidizing gases which preferably consist of a mixture of air and steam may if desired be preheated in a heat exchanger before entering the reactor. The fluidizing gas is employed for heating the particles of carbonaceous material up to combustion temperature and the heat from combustion of the carbon is used to establish and maintain the temperature required for pyrohydrolyis.

The volume and velocity of gas required for maintaining the particles of solid carbonaceous material in suspension in a fluidized bed in the reactor may be calculated in known manner for the size of the particles in the charge at hand. While preferred, it is not necessary however for all of the solid particles of carbonaceous material to be suspended in the fluidizing gas. The essential requirement is that a substantial proportion and preferably all of the granules be lifted and suspended in the gas stream in a fluidized bed in which the individual granules are only in intermitent, if any, contact with each other. Established well known principles in the art regarding fluidization of pulverulent solids generally will apply as to the conditions of gas flow required for achieving fluidization of the solid particles of carbonaceous material treated in accordance with the present invention. Any inert gas may be used to fluidize the particles of carbonaceous material but in the usual case it is most economical to use air and steam as the fluidizing gas. The air and steam required for pyrohydrolysis may be supplied separately, if desired.

For a better understanding of further details of the present invention, reference will be made to the accompanying drawing which illustrates a preferred form of apparatus for carrying out the process of the present invention.

Refering to the drawing, a reactor 10 is provided with a plate 12 having small openings distributed over its entire surface. The plate 12 is a ceramic grid but it may be made of any porous material which will withstand the temperature of the pyrohydrolysis reaction. The reactor shown in the drawing has a diameter of 25 centimeters at the grid and a diameter of 65 centimeters in the top cylindrical portion. The reactor measures two hundred centimeters from top to bottom.

The charge of particles of waste carbonaceous material containing fluorine is fed to the reactor by means of feed pipe 14, from a hopper (not shown) having a bed of charge of sufficient depth to seal the reactor or the charge may be blown into the reactor under a slight pressure. The rate at which the charge is fed is controlled by a conventional valve (not shown).

In the apparatus illustrated in the drawing, a mixture of steam and air for fluidizing the charge is supplied to the bottom of the reactor by pipe 16 in sufficient volume and velocity to maintain a fluidized bed of particles in the conical portion of the reactor below feed pipe 14 where the pyrohydrolysis reaction takes place. As the reaction continues, ash will collect in the bottom of the reactor 10. This ash may be continuously removed in batches by means of an overflow 17 which is suitably a conventional lock device. To remove a batch of ash, the pressure within the reactor is dropped. However, there is no need to completely shut down the reactor. The gas containing hydrogen fluoride and dust and some of the lighter ash passes from the top of the reactor through pipe 18 into accumulator 20 where the dust and lighter ash settle and are removed through pipe 22. The gas passes overhead preferably into the heat exchanger 24 to preheat the mixture of steam and air supplied to the reactor through pipe 16. Thereafter, the gas is fed to the bottom of conventional wash tower 26 by means of pipe 28 where the gas moves up through wash water supplied by pipe 30. The inert gases leave the top of the wash tower at 32 and the water which has absorbed the hydrogen fluoride gas is recovered from the bottom of the tower at 34 as hydrofluoric acid.

In a typical operation, solid carbonaceous waste material obtained from an aluminum furnace and crushed to a particle size of not over 3 millimeters was fed to the reactor. The solid feed contained forty percent by weight of carbon and 60 percent by weight of ash. The fluorine content of the feed was about thirteen percent by weight.

Steam and air in various proportions were mixed and fed into the bottom of the reactor at varying temperatures. The flow of steam and air through the ceramic grid suspended the particles of carbonaceous material in a fluidized bed in the conical portion of the reactor. Water supplied to the wash was recovered as hydrofluoric acid which contained fluorine.

A table indicating the percentage of fluorine recovery and steam use efficiency (kilograms of steam used per kilogram of recovered fluorine) at varying steam-air proportions and at various temperatures is given below.

Table

| | Recovery of fluorine in percent and steam use efficiency ratio | | | | | | | |
|---|---|---|---|---|---|---|---|---|
| | Reaction Temperature | | | | | | | |
| Proportion of steam | 900 to not more than 1000° C | | More than 1000 to not more than 1100° C | | More than 1100 to not more than 1200° C | | Above 1200° C | |
| in steam-air mixture in % by volume | Fluorine recovery | Steam use eff. | Fluorine recovery | Steam use eff. | Fluorine recovery | Steam use eff. | Fluorine recovery | Steam use eff. |
| 45 to not more than 50 | 53% | 24 | 74% | 17 | 88% | 15 | 98% | 13 |
| More than 50 to not more than 55 | 56% | 25 | 71% | 20 | 84% | 17 | | |
| More than 55 to not more than 60 | 48% | 32 | 79% | 19 | 84% | 18 | | |
| Above 60 | 61% | 29 | 77% | 23 | 81% | 21 | | |

For each of the temperature ranges cited in the Table, it is meant that the reaction was carried out between the lower and upper limits. Due to the nature of the reaction, it was virtually impossible to hold an absolutely steady temperature and, therefore, the upper and lower limits of the temperature range between which the reaction was carried out for each test are listed in the Table. Similarly, with respect to the proportion of the steam in the steam-air mixture, the limits indicate the range within which the proportion of steam was held since again it is virtually impossible to maintain an exact percentage of steam.

In each of the tests cited in the Table, the fluorine-containing carbonaceous material was maintained on the fluidized bed and the pyrohydrolysis reaction was carried out for a period of approximately one hour. It will be understood that since this is a continuous reaction, some of the particles may have been retained on the fluidized bed for a period less than 1 hour and some may have been maintained on the bed for a period of more than 1 hour but the average retention time was approximately 1 hour.

As can be seen from the above table the continuous process of the present invention yields a high percentage recovery of fluorine without a correspondingly high proportion of steam and poor steam use efficiency as is required with prior art processes. This higher recovery with lesser proportion of steam and lower consumption of steam per kilogram of fluorine recovered are important economical advantages. Additional economic advantage with the continuous process of the present invention is that there is no expensive downtime for emptying ash and dust from the reactor.

It is pointed out that the fluorine recovery or yield varies non-linearly with respect to the increase in the proportion of steam in the steam-air mixture for the temperature ranges above 1000° C. For example, in the temperature range of from more than 1000 to not more than 1100° C, the steam proportion is varied from 45 to not more than 60 percent and the yield varies from 74 to 71 to 79 percent; and in the temperature range of from more than 1100° to not more than 1200° C, the steam proportion is again varied from 45 to not more than 60 percent and the yield varies from 88 to 84 to 84 percent. It is seen that the yield varies non-linearly over the two temperature ranges set forth regardless of the specific steam proportion chosen within the range set forth. The steam use efficiency similarly varies non-linearly with respect to increased steam proportion.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. A continuous method of recovering fluorine as hydrogen fluoride from particles of fluorine-containing solid carbonaceous material by pyrohydrolysis which comprises:
   a. a stream of gas comprising from 45 to 50% steam;
   b. continuously feeding solid carbonaceous material of less than about 10 millimeters in size onto the said stream of gas;
   c. forming a fluidized bed by having said carbonaceous material suspended in said stream of gas;
   d. maintaining a temperature of at least above 1100° C. in said fluidized bed for a sufficient time whereby said carbonaceous material is pyrohydrolyzed and evolves gaseous hydrogen fluoride; and e. collecting said evolved hydrogen fluoride whereby the recovery of fluorine from said carbonaceous material by said method is from 88 to 98% of the fluorine contained in said carbonaceous material and whereby the efficiency of said method expressed as a ratio of kilograms of steam used per kilogram of fluorine recovered is from 13 to 15.

2. A continuous method of recovering fluorine as hydrogen fluoride from particles of fluorine-containing solid carbonaceous material by pyrohydrolysis which comprises:

a. a stream of gas comprising from 45 to 60% steam;

b. continuously feeding solid carbonaceous material of less than about 10 millimeters in size onto the said stream of gas;

c. forming a fluidized bed by having said carbonaceous material suspended in said stream of gas;

d. maintaining a temperature of at least above 1100° C. in said fluidized bed for a sufficient time whereby said carbonaceous material is pyrohydrolyzed and evolves gaseous hydrogen fluoride; and e. collecting said evolved hydrogen fluoride whereby the recovery of fluorine from said carbonaceous material by said method is from 84 to 98% of the fluorine contained in said carbonaceous material and whereby the efficiency of said method expressed as a ratio of kilograms of steam used per kilogram of fluorine recovered is from 13 to 18.

3. The method of claim 2, wherein ash is continuously removed in batches.

4. The method of claim 2, wherein the said hydrogen fluoride is collected by absorption in a liquid selected from the group consisting of water and an aqueous alkali solution.

5. The method of claim 2, wherein the gaseous hydrogen fluoride is collected by adsorption on the surface of a particulate solid material.

6. The method of claim 2, wherein the said stream of gas consists essentially of air and steam.

7. The method of claim 1, wherein the said solid carbonaceous material of step (b) is less than about 3mm in size.

* * * * *

UNITED STATES PATENT AND TRADEMARK OFFICE
CERTIFICATE OF CORRECTION

PATENT NO. : 4,065,551
DATED : December 27, 1977
INVENTOR(S) : Erik Qvale Dahl

It is certified that error appears in the above-identified patent and that said Letters Patent are hereby corrected as shown below:

Column 2, line 19, "pyrohydrolyis" should read --pyrohydrolysis--.

Column 2, line 46, "Refering" should read --Referring--.

Column 6, line 21, "claim 1" should read --claim 2--.

Signed and Sealed this

Tenth Day of October 1978

[SEAL]

Attest:

RUTH C. MASON
*Attesting Officer*

DONALD W. BANNER
*Commissioner of Patents and Trademarks*